United States Patent
Hicks

(10) Patent No.: US 8,180,606 B2
(45) Date of Patent: May 15, 2012

(54) WIDE ANGLE SUBSTANTIALLY NON-DISTORTING MIRROR

(75) Inventor: Robert Andrew Hicks, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 320 days.

(21) Appl. No.: 12/524,701

(22) PCT Filed: Jan. 29, 2008

(86) PCT No.: PCT/US2008/052271
§ 371 (c)(1),
(2), (4) Date: Jul. 27, 2009

(87) PCT Pub. No.: WO2008/094886
PCT Pub. Date: Aug. 7, 2008

(65) Prior Publication Data
US 2010/0033854 A1    Feb. 11, 2010

Related U.S. Application Data

(60) Provisional application No. 60/887,698, filed on Feb. 1, 2007.

(51) Int. Cl.
*G06F 7/60* (2006.01)
(52) U.S. Cl. .......................................... 703/2
(58) Field of Classification Search .......... 359/841, 359/872, 846; 703/2
See application file for complete search history.

(56) References Cited

U.S. PATENT DOCUMENTS
6,412,961 B1   7/2002   Hicks

FOREIGN PATENT DOCUMENTS
EP   0895098 A1   2/1999
WO   0058129   10/2000

OTHER PUBLICATIONS

Hicks, R. Andrew, "Designing a Mirror to Realize a Given Projection," J. Opt. Soc. Am. A, vol. 22, No. 2, Feb. 2005, pp. 323-330.*
Hicks, R. Andrew, "An exact expression for the image error in a catadioptric sensor," arXiv preprint physics/0410058 posted on arXiv, Mar. 24, 2003.*

(Continued)

*Primary Examiner* — Stephone Allen
*Assistant Examiner* — Kimberly N Kakalec
(74) *Attorney, Agent, or Firm* — Knoble Yoshida & Dunleavy, LLC

(57) ABSTRACT

The invention relates to a reflective surface substantially perpendicular to a vector field described by the equation:

$$W(x, y, z) = \frac{\text{target}(x, y, z) - [x, y, z]}{\|\text{target}(x, y, z) - [x, y, z]\|} + \frac{\text{source}(x, y, z) - [x, y, z]}{\|\text{source}(x, y, z) - [x, y, z]\|}$$

and a computer program for forming the reflective surface. The reflective surface is capable of providing a substantially undistorted wide-angle field of view. It is particularly useful as a driver's side mirror of a vehicle to provide an enlarged, substantially undistorted field of view which may be used to reduce or eliminate blind spots.

19 Claims, 6 Drawing Sheets

OTHER PUBLICATIONS

Rahul Swaminathan, Shree K. Nayar and Michael D. Grossberg. "Framework for Designing Catadioptric Projection and Imaging Systems". In Proceedings IEEE Conf. on Computer Vision-PROCAMS, Nice, France 2003.

Rahul Swaminathan, Michael D. Grossberg and Shree K. Nayar. "Designing Mirrors for Catadioptric Systems that Reduce Image Errors". In Proc. European Conf. on Computer Vision-OMNIVIS, Prague, 2004.

Mandyam V. Srinivasan. A New Class of Mirrors for Wide-angle Imaging. In Proceedings of IEEE Workshop on Omnidirectional Vision and Camera Networks, Madison Wisconsin, USA, Jun. 2003.

Hicks, R. Andrew, "Designing a Mirror to Realize a Given Projection", J. Opt. Soc. Am. A, vol. 22, No. 2, Feb. 2005, pp. 323-330.

R. Andrew Hicks, Ronald K. Perline, "The Method of Vector Fields for Catadioptric Sensor Design with Applications to Panoramic Imaging," cvpr, vol. 2, pp. 143-150, 2004 IEEE Computer Society Conference on Comuputer Vision and Pattern Recognition (CVPR'04)—vol. 2, 2004.

R. Andrew Hicks, Ronald K. Perline, "Geometric Distributions for Catadioptric Sensor Design," cvpr, vol. 1, pp. 584, 2001 IEEE Computer Society Conference on Computer Vision and Pattern Recognition (CVPR'01)—vol. 1, 2001.

Hicks, R. Andrew, "An exact expression for the image error in a catadioptric sensor", arXiv preprint physics/0410058 posted on arXiv, Oct. 8, 2004.

Hicks, R. Andrew, "Differential Methods in Catadioptric Sensor Design with Applications to Panoramic Imaging", arXiv preprint cs.CV/0303024 posted on arXiv, Mar. 24, 2003.

Hicks, et al., "Blind-Spot Problem for Motor Vehicles", Applied Optics, vol. 44, No. 19, Jul. 1, 2005, pp. 3893-3897.

Extended European Search Report, Application No. EP 08728429, Issued Dec. 21, 2011.

R. Andrew Hicks et al.; "Blind-Spot Problem for Motor Vehicles",Applied Optics, vol. 44, No. 19, Jul. 1, 2005.

* cited by examiner

WIDE ANGLE SUBSTANTIALLY NON-DISTORTING MIRROR

BACKGROUND OF THE INVENTION

1. Field of the Invention

The invention is directed to a curved reflective surface capable of providing a substantially undistorted wide-angle field of view and a computer program for forming said reflective surface. The invention may have applications in the field of illumination optics and driver's side mirrors.

2. Description of the Related Technology

The U.S. Department of Transportation reported that lane changes and merger (LCM) crashes alone accounted for approximately 244,000 crashes in the United States in 1994, causing 225 deaths and many serious injuries. This figure represents approximately 4% of all vehicular crashes and is largely attributed to the minimal view provided by side view mirror's. For most passenger side mirrors, the optical axis of the viewer's eye reflects off the mirror at approximately a 90° angle. A flat driver side view mirror, however, typically provides a viewing angle of approximately 15°. Therefore, to ensure driver safety, there is a need to develop wide-angle side view mirrors, particularly wide-angle driver's side view mirrors, capable of enlarging the reflected field of view when the mirror is viewed from the typical driver's position.

It is known to use curved mirrors to enlarge a field of view. For example, curved mirrors have previously been incorporated in the rear view and side view mirrors of automobiles, as disclosed in U.S. patent publication nos. 2003/0039039, 2003/0081334 and 2004/0114260 and U.S. Pat. Nos. 6,979,090, 6,069,755, 5,980,050, 5,166,833, 4,580,881 and 4,331,382.

Other forms of curved mirrors include side view mirrors that are capable of being manipulated into a curved configuration, such as is disclosed in Korean patent publication KR 1004847. The reflected images of these mirrors, however, are generally significantly distorted, depending upon the curvature and shape of the mirror.

Distorted images are non-perspective projections. A perspective projection, by contrast, is formed by tracing a line from the image plane through a point, known as the focal point or center of projection, until it touches an object in the scene. Pinhole cameras, for example, utilize this method for forming perspective images.

Historically, it was only possible to construct mirrors in spherical or parabolic shapes for traditional applications, such as in telescope designs. In recent years though, it has become possible, through computer controlled machining, to create parts of almost any given mathematical shape. Consequently, it is now possible to make mirrors with an exactly prescribed geometry, even if it is highly irregular in shape. Although the technology exists for customizing the geometry of a reflective surface, as far as the applicant is aware, there currently exists no reflective surface capable of enlarging the field of view of a driver side view mirror and reflecting a substantially undistorted image.

SUMMARY OF THE INVENTION

The invention relates to a novel curved reflective surface capable of projecting a substantially undistorted image.

In second aspect, the invention is directed to a method and computer program for making the reflective surface.

DETAILED DESCRIPTION OF THE PREFERRED EMBODIMENTS

Figure 1:
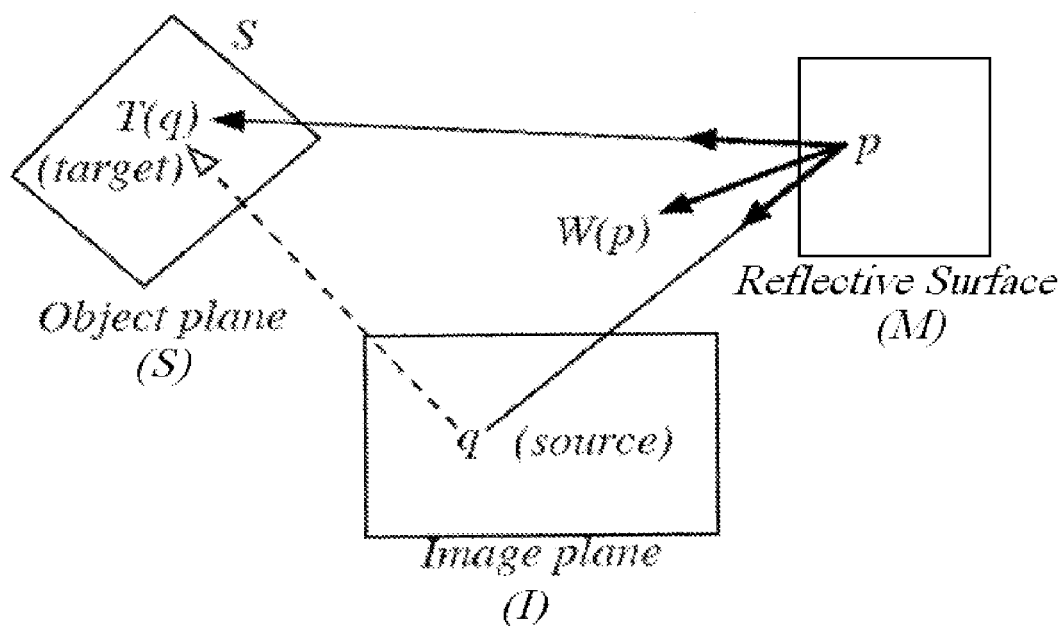
FIG. 1 is a schematic diagram illustrating the derivation for the formula of the equation of the vector field W(x,y,z), given a transformation T from the image plane to the object plane.

The present invention is directed to a novel contoured reflective surface capable of projecting a substantially undistorted wide-angle field of view or controlling illumination intensity. In a specific embodiment, the invention may be constructed as a driver's side view mirror of a vehicle such as an automobile, train, watercraft, aircraft, motorcycles, buses or any other vehicle capable of projecting a substantially undistorted reflection. The projection of a substantially undistorted reflection is referenced here when the reflective surface is viewed from the perspective of a seated driver. In the context of this patent application, "driver" refers to the operator of any vehicle including at least automobiles, trains, watercraft, aircraft, motorcycles, buses, etc.

The driver's side view mirror can be provided with a customizable wide viewing angle which is preferably an angle of at least 30°, more preferably, an angle of at least 40°, and, most preferably, an angle of at least 45°, for reducing or eliminating blind spots in the driver's rear field of view. The field of view is referenced here as the view when the reflective surface is viewed from the perspective of a seated driver.

For the purpose of this patent application, the term "substantially undistorted" is defined by an error quantity, $I_e$, of less than about 15%. Preferably $I_e$ is less than about 10%, more preferably, less than about 5% and most preferably, less than about 3%. $I_e$, which is calculated according to Equation 1, represents the error formed by the projection from a domain A, within an object plane, to an object plane via a mirror M. Namely, given a mirror M it induces a transform from the image plane to the object plane by tracing light rays backwards from the image plane, off of the mirror and to the object surface.

$$I_e = \frac{1}{\text{diameter}(T(A))} \left( \int_A \|T(y,z) - T_M(y,z)\|^2 \, dy\, dz \right)^{1/2} \quad \text{Equation 1}$$

To obtain a substantially undistorted reflection of an object surface a transform function, T, maps an object surface S to an image plane I in a prescribed way, i.e. T:I→S. T(A) is the image of a domain A, which varies depending on the application, in the image plane over which the reflective surface M is a graph. $T_M$ is the transformation induced from the image plane to the object surface by a mirror M. Equation 1 provides a means of comparing the actions of T and $T_M$ and may be interpreted as an average, computed by considering the distance between an image of a point in the image plane under the given transform and the transform induced by the mirror.

The invention is directed to a novel reflective surface x=f(y,z), which may be described by a collection of points (x, y, z) in space such that, when viewed along the positive x axis, the induced projection maps a point source(x,y,z) on an image plane I to a point T(source(x,y,z)) on an object plane S. Note that this is the opposite of the direction that real light travels, but is framed this way for mathematical simplicity. Based on this correspondence, a vector field, W(x,y,z) is then defined on some subset of three dimensional space via the construction given in FIG. 1.

Figure 2:
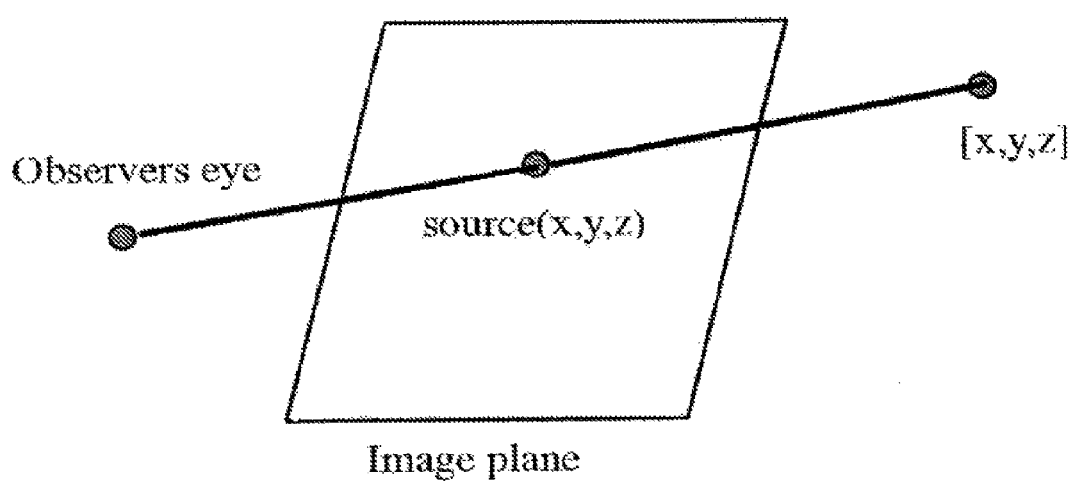
FIG. 2 is a schematic diagram depicting source(x,y,z).

To compute the vector function W(x,y,z), a point [x,y,z] is projected along a ray to a point denoted as source(x,y,z), located in the image plane I, as is depicted in FIG. 2. The given correspondence function T may be used to then compute the desired point $T_M$(source(x,y,z)) of a target, 2. Then unit vectors, from point p to source point source(x,y,z) and target $T_M$(source(x,y,z)) may then be computed and added to define the vector W(x,y,z). This procedure defines a non-zero vector field W(x,y,z) on a subset of three dimensional space.

If a surface M exists which is perpendicular to vector field W at each the points of M, then M is an exact solution to the problem. The length of vector field W is irrelevant so long as the tangent planes to M are perpendicular to vector field W.

As in FIG. 1, a vector W(x,y,z) may be defined by adding the unit vector from point p to point source, to the unit vector from point p to point T(source(x,y,z)). If a vector field is found to exist that is normal to a surface, then by use of elementary calculus M may be found. A test for this situation is that an exact solution exists if and only if $(\nabla \times W) \cdot W = 0$. In this case elementary calculus may be applied to find a solution, i.e., any one of the components of vector field W may be integrated with respect to the appropriate variable to obtain an equation for M.

Figure 3:
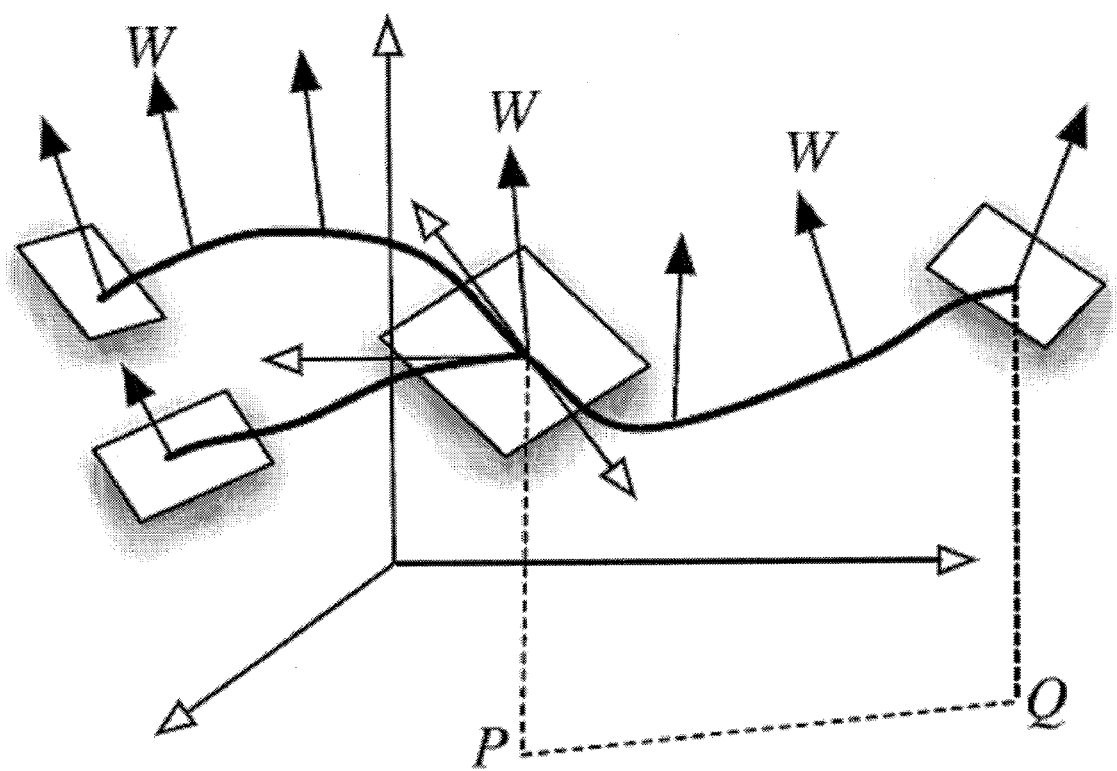
FIG. 3 illustrates the process of computing points on the surface $M_A$ using the slice method.

Because not every vector field is normal to a surface, i.e. a surface normal to vector field W, when M does not exist, an approximate solution surface $M_A$, may be determined using a novel heuristic computation, known as the "slice method". Given a proposed normal vector to the surface, points on the surface can be found by integrating along "slices" of the distribution determined by vector field W, as shown in FIG. 3. By integrating along the slices, it is possible to generate a reflective surface, where the height of the surface above P is the initial condition, and integrating along a straight line to Q to define the height above Q, as shown in FIG. 3.

Figure 5:
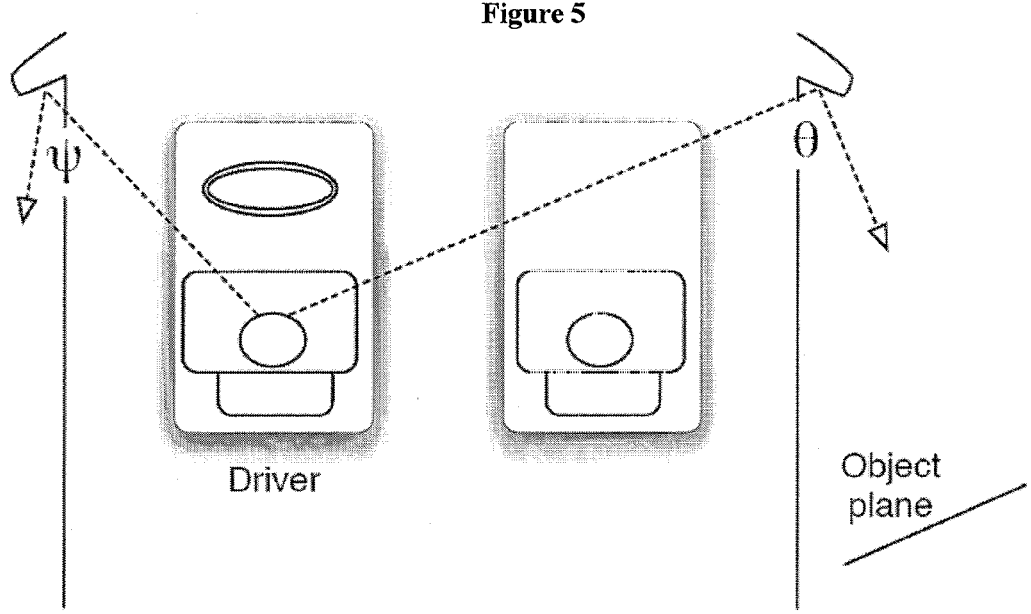
FIG. 5 illustrates a driver's side view mirror having a deflection angle of $\psi°$ and a passenger's side view mirror having a deflection angle $\theta°$.

To determine the coordinates of a vector W at a point [x,y,z], first a source point, source, in the image plane is calculated, source(x,y,z)=[source$_1$(x,y,z),source$_2$(x,y,z),source$_3$(x,y,z)], where source(x,y,z) is defined as the point in the image plane intersected by the ray containing [x,y,z] and the coordinates corresponding to the eye of an observer, 3, to obtain a source, as in FIG. 2. The point on the object surface, target(x,y,z) is defined to be T(source(x,y,z)), which in the case of the application of a side view mirror is given explicitly in Equation 2 as:

$$\text{target}(x,y,z) = k\lambda \text{source}_2(x,y,z)[-\sin(\psi), \cos(\psi), 0] + k\lambda \text{source}_3(x,y,z)[0,0,1] + k[\cos(\psi), \sin(\psi), 0] \quad \text{Equation 2}$$

where k is the distance between the reflective surface and object plane, $\psi$ is the angle of deflection of the mirror as indicated in FIG. 5 and $\lambda$ is a magnification factor. Increasing $\lambda$ will increase the field of view of the observer. The vector field W is then defined as:

$$W(x, y, z) = \frac{\text{target}(x, y, z) - [x, y, z]}{\|\text{target}(x, y, z) - [x, y, z]\|} + \frac{\text{source}(x, y, z) - [x, y, z]}{\|\text{source}(x, y, z) - [x, y, z]\|} \quad \text{Equation 3}$$

To obtain equation 4 the slice method is applied to W to yield a collection of points in three dimensional space that lie on the surface $M_A$. Any standard available mathematical algorithm or software program may then be used to generate a surface fit to these data points, i.e. generate a formula of the type given in Equation 4.

Figure 4:
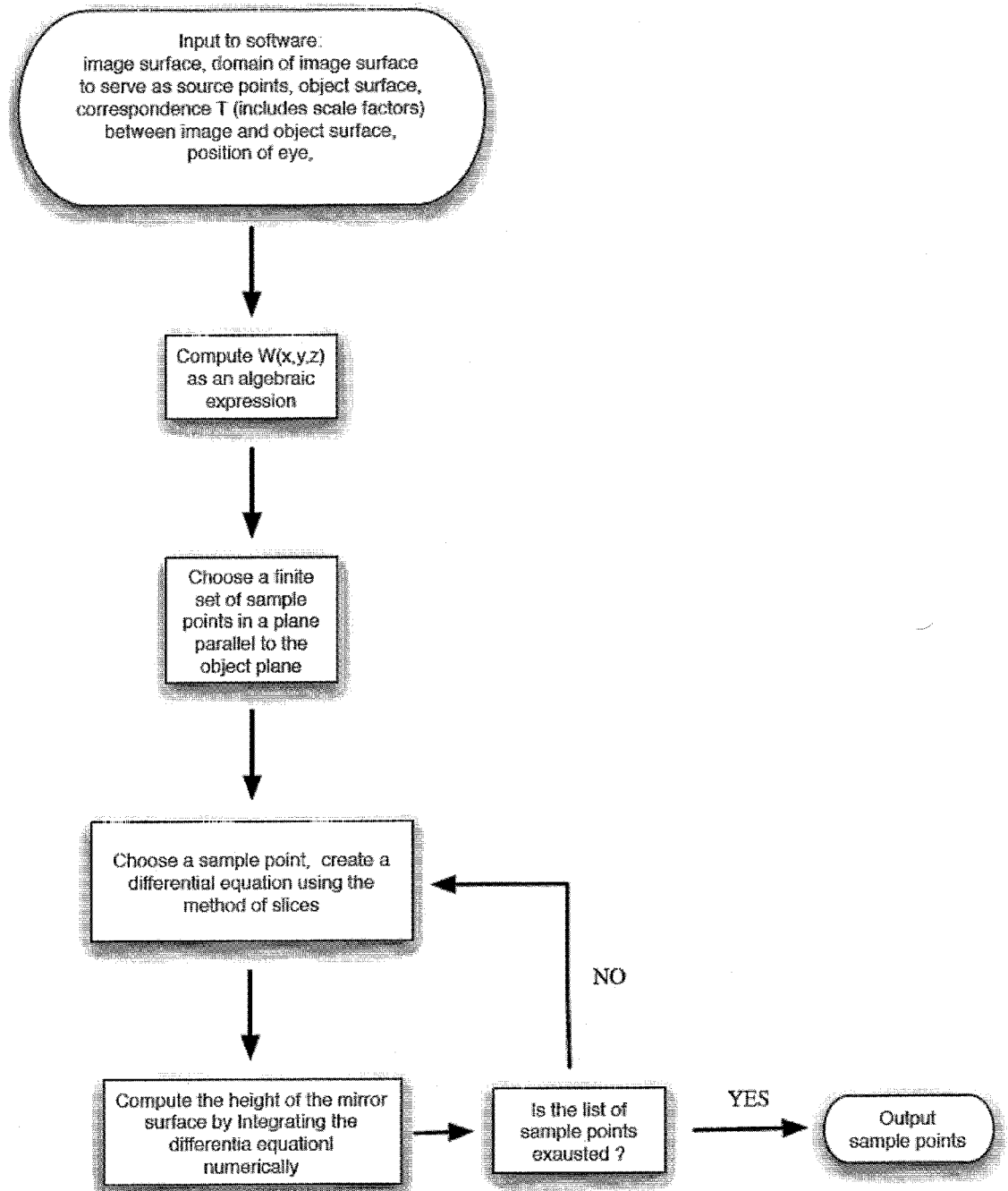
FIG. 4 is a flowchart of a software process for generating a reflective surface in accordance with the present invention.

A flow chart of a software program suitable for generating the reflective surface of the present invention is shown in FIG. 4. Upon inputting parameters representing the image surface, source points, object surface, correspondence between the image and object surface, and observation point, the program computes an algebraic expression of W(x,y,z). The program then performs the slice method to generate sample points located on the reflective surface $M_A$. Minor changes in the software may be used to produce a reflective surface to accommodate drivers of different heights, different fields of view, different deflection angle $\psi$, etc.

By appropriate choice of parameters for determining T, such as image plane coordinates, object plane coordinates and magnification factor, the resultant reflective surface is capable of reflecting wide fields of view. The reflective surface may also be tilted and adjusted to reduce or enlarge the field of view. Additionally, the reflective surface advantageously projects a substantially undistorted image, as shown in FIG. 7(b).

The reflective surface of the present invention has numerous applications. In one embodiment, it may be constructed as a driver side mirror for a vehicle, such as an automobile, train, watercraft, aircraft, motorcycle or other vehicle to provide the driver or pilot with an undistorted and enlarged field of view for eliminating blind spots. The invention is particularly effective as a driver's side view mirror. Such a side view mirror is robust and is not substantially dependent on the location of the driver's head.

The reflective surface may also have numerous applications in the fields of illumination optics or non-imaging optics, which are concerned with the redistribution of radiation, at a prescribed intensity, from a collection of sources onto a target. J. H. McDermit and T. E. Horton, "Reflective optics for obtaining prescribed irradiative distributions from collimated sources," *Applied Optics*, 13:1444-1450, 1974; and R. Winston, J. Minano, and P. Benitez, "Nonimaging Optics," Elsevier Academic Press, 2005.

The reflective surface may be used to shape laser beams as an alternative to, for example, D. L. Shealy, "Theory of geometrical methods for design of laser beam shaping systems," *In Laser Beam Shaping*, Fred M. Dickey and Scott C. Holswade, eds., Proc. SPIE 4095, pages 1-15. SPIE Optical Engineering Press, San Diego, 2000., to enhance solar collector designs (see e.g. R. Winston, "Selected Papers on Nonimaging Optics" SPIE Optical Engineering Press, Bellingham, Wash., 1995), and control, focus or diffuse the illumination of any source, such as a light emitting diode, by directing the projection of the reflected light. Others have done some similar work on the illumination problem. See e.g. T. Glimm and V. Oliker, "Optical design of single reflector systems and the monge-kantorovich mass transfer problem" *J. of Math, Sciences*, 117:4096-4108, 2003; T. Glimm and V. Oliker, "Optical design of two-reflector systems, the monge-kantorovich mass transfer problem and fermat's principle,"

*Indiana Univ Math. J,* 53:1255-1277, 2004; V. Oliker and S. Kochengin, "Computational algorithms for constructing reflectors," *Computing and Visualization in Science,* 6:15-21, 2003; and H. Ries and J. Muschaweck, "Tailored freeform optical surfaces," *J. Opt. Soc. Am. A,* 19:590-595, 2002.

These non-imaging optical applications utilize a simple means to realize a perspective projection, similar to the operation of pinhole cameras. Pinhole cameras typically operate by imaging a two-parameter family of rays through a pinhole. Given the principle of reversibility in geometric optics, which provides that rays may be thought of as either entering or leaving an optical system, i.e. sources may be considered to lie on the image plane, the pinhole camera may therefore be considered the source of the ray bundle. Therefore the theory behind forming a prescribed image with a pinhole camera and a curved mirror is equivalent to controlling illumination with a single source. Thus, for non-imaging applications such as controlling the illumination of an LED, the eye of the observer, 3, as shown in FIG. 2, corresponds to the LED and the object surface is the surface to be illuminated.

EXAMPLE 1

A reflective surface $M_A$ is illustrated in the context of a coordinate system containing a driver's side view mirror having an angle of deflection $\psi=65°$ as shown in FIG. 5. Assuming that the eye of the driver is located at the coordinate [10,0,0] in a xyz space, a yz image plane at the coordinate [9,0,0] and a mirror centered at the origin [0,0,0], it is possible to compute a reflective surface $M_A$ capable of providing an undistorted wide angle field of view. A typical driver's side mirror subtends approximately a 15° field of view. To determine the vector field W(x,y,z), a source point was first calculated from (x,y,z), i.e. the point in the image plane intersected by the ray containing [x,y,z] and the eye of the observer at [10,0,0], resulting in source(x,y,z)=[9, y/(10−x), z/(10−x)].

T was calculated based on k=10 and λ=4. Then applying the program depicted in FIG. 4, W(x,y,z) is determined and the method of slices, according to Equations 2 and 3, was applied over a region x=0, −1≤y≤1, −0.6≤z≤0.6, generating a set of data points on the reflective surface; these values may vary to suit different situations. A surface was fit to these data points, and choosing units now to be millimeters and y=−60 mm to 60 mm and z=−36 mm to 36 mm results in Equation 4:

$$x(y,z)=-0.00166346z^2+0.0000000141941z^4+$$
$$0.637076y+0.00000290062yz^2-7.03493\times10^{-11}yz^4-0.001670555y^2+0.000000020558y^2z^2+$$
$$0.00000290799y^3-$$
$$0.0000000001114081y^3z^2+0.00000000612366y^4-$$
$$4.10119\times10^{-11}y^5, \quad \text{Equation 4}$$

Figure 6:
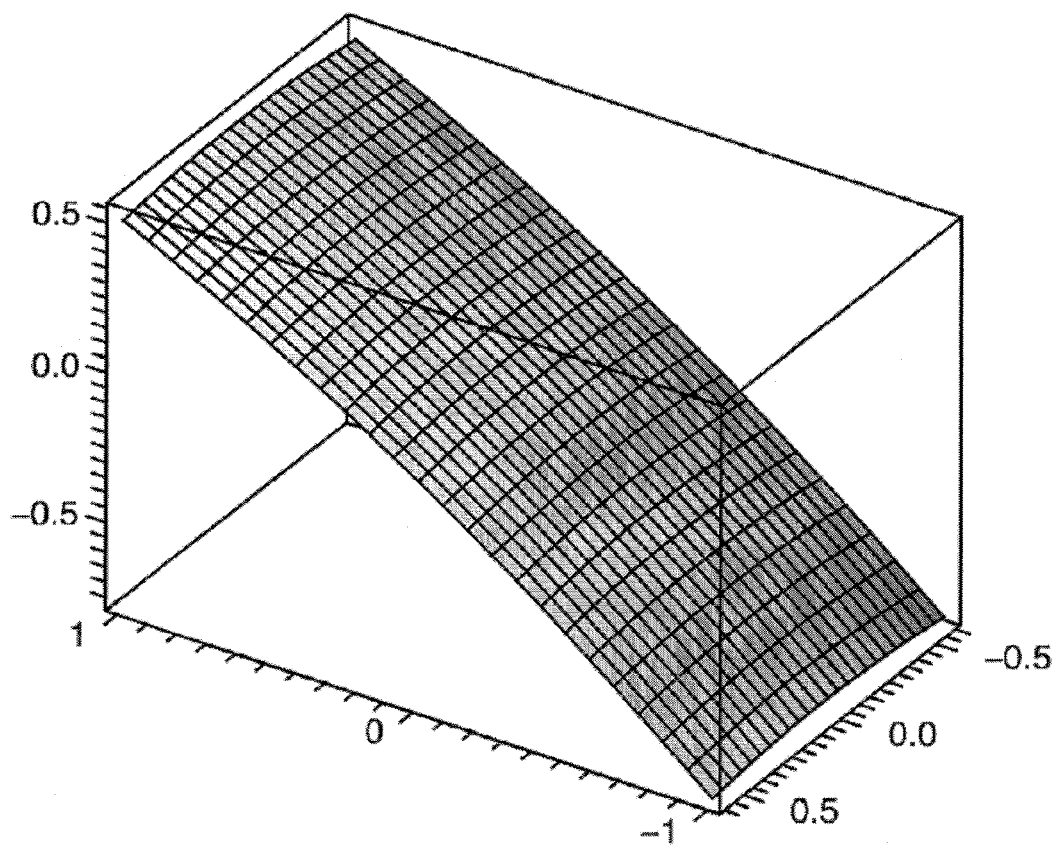
FIG. 6 is a curved reflective surface defined by Equation 4.

FIG. 6 is a graph of the resultant reflective surface defined by Equation 4.

It should be noted that changes in these parameters may be made to accommodate similar situations. For example the vertical height of the mirror may be required to be different in which case W stays the same, but different integration parameters are chosen. This surface is designed to be centered at eye level and robust to motion.

Figure 7A:
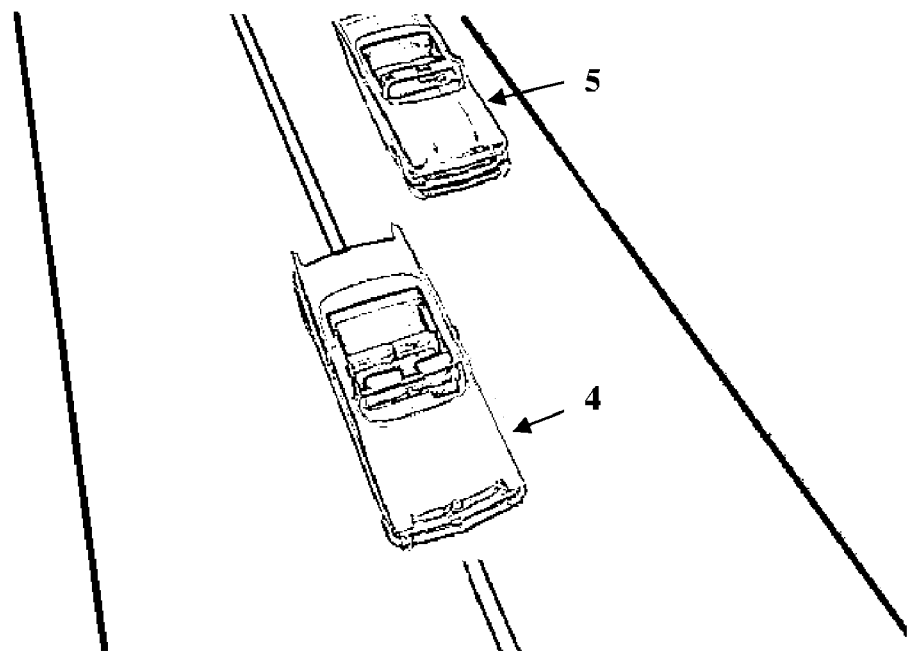
FIG. 7(a) shows an experimental setup of two cars wherein Car A has a side view mirror incorporating the reflective surface of the present invention.
Figure 7B:
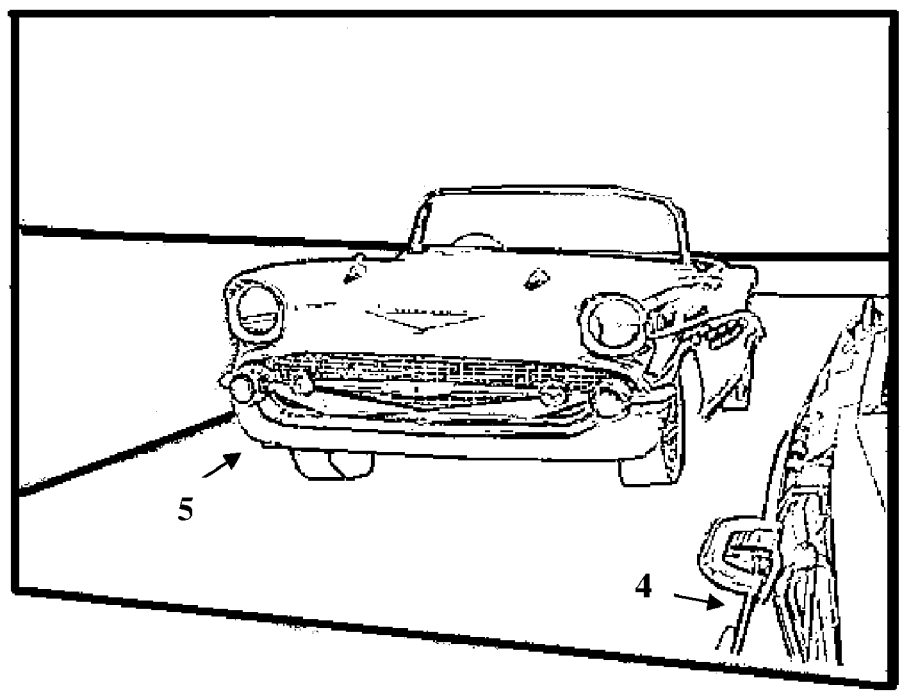
FIG. 7(b) shows an image of the view that a driver of Car A would see in the driver's side view mirror according to the present invention.
Figure 7C:
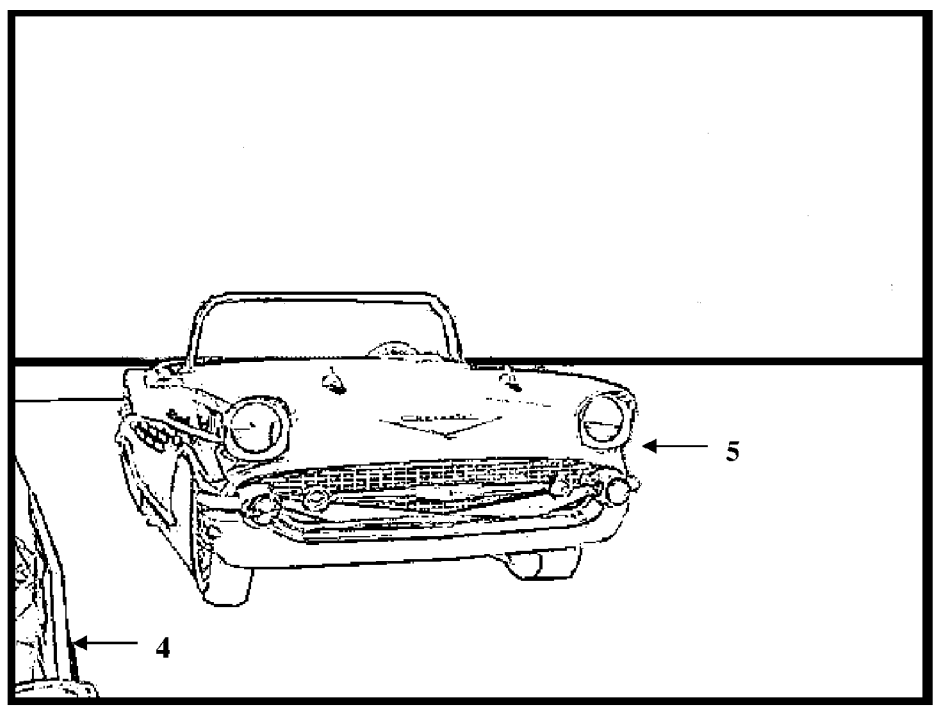
FIG. 7(c) shows an image of Car B as viewed by a driver sitting in Car A that puts his head out the window and looks back at Car B.

The reflective surface of Example 1 may be incorporated in the driver's side mirror shown in FIG. 7(*b*). FIG. 7(*a*) shows Car B, 5, located in the blind spot of Car A's, 4, driver's side view mirror. FIG. 7(*b*) depicts the image of Car B, 5, seen by the driver of Car B, 5, viewed in a driver's side view mirror of the present invention. FIG. 7(*c*) depicts the image that a driver of Car A, 4, would see if the driver extended his head out the driver's side window of Car A, 4, and turned his head around to look at Car B, 5. Note that the mirror provides the driver with an entirely visible and substantially undistorted 45° view of Car B, 16. By comparison, the field of view provided by standard driver side view mirrors is approximately 13° to about 15°.

Having described the preferred embodiments of the invention which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, the intended scope of protection is set forth in the appended claims.

The invention claimed is:

1. A reflective surface substantially perpendicular to a vector field defined by equations 1-2:

$$W(x,y,z) = \frac{\text{target}(x,y,z)-[x,y,z]}{\|\text{target}(x,y,z)-[x,y,z]\|} + \frac{\text{source}(x,y,z)-[x,y,z]}{\|\text{source}(x,y,z)-[x,y,z]\|} \quad \text{Equation 1}$$

wherein target (x,y,z) is a point on an object plane defining a surface of an object and source (x,y,z) is a corresponding point on an image plane viewed by an observer that is intersected by a ray containing point (x,y,z) on the reflective surface and coordinates corresponding to a location of an eye of the observer, and $$\text{target}(x,y,z)=k\lambda\text{source}_2(x,y,z)[-\sin(\psi),\cos(\psi),0]+k\lambda\text{-source}_3(x,y,z)[0,0,1]+k[\cos(\psi),\sin(\psi),0] \quad \text{Equation 2}$$

wherein k is a distance between the reflective surface and the object plane, ψ is an angle of deflection of the reflective surface formed between the observer and object plane and λ is a magnification factor, wherein the reflective surface is capable of functioning as a driver's side mirror and reflecting at least a 30° field of view from a perspective of a seated driver, and wherein the reflective surface has an image error quantity, $I_e$, of less than about 15% as calculated according to equation 3:

$$I_e = \frac{1}{\text{diameter}(T(A))}\left(\int_A \|T(y,z)-T_m(y,z)\|^2 dydz\right)^{1/2} \quad \text{Equation 3}$$

wherein T(A) is a transform function that maps a domain, A, in the object plane to the image plane over which the reflective surface, M, is graphed, T(y,z) is a transform function that maps points on the image plane to points on the object plane, and $T_M$ is a transform function induced from the image plane to the object plane by reflecting at least one ray off M.

2. The reflective surface of claim 1, wherein the image error quantity of the reflective surface is less than about 10%.

3. The reflective surface of claim 1, wherein the image error quantity of the reflective surface is less than about 5%.

4. The reflective surface of claim 1, wherein the image error quantity of the reflective surface is less than about 3%.

5. The reflective surface of claim 1, wherein said reflective surface is capable of reflecting at least a 40° field of view when viewed from the perspective of the seated driver.

6. A driver's side view mirror for a vehicle comprising the reflective surface of claim 5.

7. The reflective surface of claim 1, wherein said reflective surface is capable of reflecting at least a 45° field of view when viewed from the perspective of the seated driver.

8. A driver's side view mirror for a vehicle comprising the reflective surface of claim 7.

9. The reflective surface of claim 1, wherein said reflective surface is adjustable to enlarge or reduce the reflected field of view from a same point of observation.

10. A driver's side view mirror for a vehicle comprising the reflective surface of claim 1.

11. The driver's side mirror of claim 10, wherein ψ is 65°.

12. The reflective surface of claim 1, wherein ψ is 65°.

13. A computer program stored on one or more computer-readable, non-transitory storage media, said computer program comprising computer-executable instructions for implementing a method for generating a reflective surface comprising the steps of:

receiving data including at least an image surface, a domain of an image surface, an object surface and the coordinates of an eye of an observer, computing a reflective surface substantially perpendicular to a vector field W(x,y,z) defined by Equations 1-2:

$$W(x, y, z) = \frac{\text{target}(x, y, z) - [x, y, z]}{\|\text{target}(x, y, z) - [x, y, z]\|} + \frac{\text{source}(x, y, z) - [x, y, z]}{\|\text{source}(x, y, z) - [x, y, z]\|} \quad \text{Equation 4}$$

wherein target(x,y,z) is a point on an object plane defining a surface of an object and source (x,y,z) is a point on an image plane viewed by an observer that is intersected by a ray containing point (x,y,z) on the reflective surface and coordinates corresponding to a location of an eye of the observer, and $$\text{target}(x,y,z) = k\lambda \text{source}_2(x,y,z)[-\sin(\psi), \cos(\psi), 0] + k\lambda \text{source}_3(x,y,z)[0,0,1] + kf\cos(\psi), \sin(\psi), 0] \quad \text{Equation 2}$$

wherein k is a distance between the reflective surface and the object plane, w is an angle of deflection of the reflective surface formed between the observer and object plane and λ is a magnification factor, wherein the reflective surface is capable of functioning as a driver's side mirror and reflecting at least a 30° field of view from a perspective of a seated driver, wherein the reflective surface has an image error quantity, $I_e$, of less than about 15% as calculated according to equation 3:

$$I_e = \frac{1}{\text{diameter}(T(A))} \left( \int_A \|T(y, z) - T_M(y, z)\|^2 dy dz \right)^{1/2} \quad \text{Equation 3}$$

wherein T(A) is a transform function that maps a domain, A, in the object plane to the image plane over which the reflective surface, M, is graphed, T(y,z) is a transform function that maps points on the image plane to points on the object plane, and T is a transform function induced from the image plane to the object plane by reflecting at least one ray off M, and generating points on a reflective surface.

14. The computer program of claim 13, wherein the reflective surface reflects a field of view of at least 40° when viewed from the perspective of the seated driver.

15. The computer program of claim 13, wherein the reflective surface reflects a field of view of at least 45° when viewed from the perspective of the seated driver.

16. The computer program of claim 13, wherein the image error quantity of the reflective surface is less than about 10%.

17. The computer program of claim 13, wherein the image error quantity of the reflective surface is less than about 5%.

18. The computer program of claim 13, wherein ψ is 65°.

19. The computer program of claim 13, wherein the image error quantity of the reflective surface is less than about 3%.

\* \* \* \* \*